(12) United States Patent
Anschuetz et al.

(10) Patent No.: US 11,941,082 B2
(45) Date of Patent: Mar. 26, 2024

(54) TECHNOLOGIES FOR CLASSIFYING FEEDBACK USING MACHINE LEARNING MODELS

(71) Applicant: UL LLC, Northbrook, IL (US)

(72) Inventors: Christian Dorn Anschuetz, Johnsburg, IL (US); Surekha Durvasula, Skokie, IL (US); Spencer Sharpe, Laramie, WY (US); Kyle Michael Caulfield, Mount Prospect, IL (US)

(73) Assignee: UL LLC, Northbrook, IL (US)

( * ) Notice: Subject to any disclaimer, the term of this patent is extended or adjusted under 35 U.S.C. 154(b) by 932 days.

(21) Appl. No.: 16/383,202

(22) Filed: Apr. 12, 2019

(65) Prior Publication Data
US 2020/0327372 A1    Oct. 15, 2020

(51) Int. Cl.
| | |
|---|---|
| G06F 3/048 | (2013.01) |
| G06F 3/0482 | (2013.01) |
| G06F 18/21 | (2023.01) |
| G06F 18/214 | (2023.01) |
| G06F 18/2431 | (2023.01) |
| G06Q 30/0203 | (2023.01) |

(52) U.S. Cl.
CPC ........ *G06F 18/2148* (2023.01); *G06F 3/0482* (2013.01); *G06F 18/2178* (2023.01); *G06F 18/2431* (2023.01); *G06Q 30/0203* (2013.01)

(58) Field of Classification Search
CPC ............ G06N 20/00; G06N 5/04; G06N 5/02; G06N 5/025; G06F 3/0482; G06F 16/35
See application file for complete search history.

(56) References Cited

U.S. PATENT DOCUMENTS

| | | | |
|---|---|---|---|
| 7,124,101 B1 | 10/2006 | Mikurak | |
| 7,593,904 B1 * | 9/2009 | Kirshenbaum | ........ G06Q 10/10 |
| | | | 706/20 |
| 9,342,587 B2 * | 5/2016 | Ghosh | ................. G06F 16/3349 |
| 9,367,851 B2 | 6/2016 | Dale et al. | |
| 9,928,294 B2 * | 3/2018 | Venkataraman | ...... G06F 16/353 |
| 10,019,716 B1 * | 7/2018 | Ainslie | ................ G06Q 30/016 |

(Continued)

OTHER PUBLICATIONS criticalmention.com, "Critical mention, Houston, we have a problem." (2019) Critical Mention, Inc. Retrieved from the Internet on Sep. 13, 2019: https://www.criticalmention.com/Sentiment/Analysis.

(Continued)

*Primary Examiner* — Steven B Theriault
(74) *Attorney, Agent, or Firm* — MARSHALL, GERSTEIN & BORUN LLP

(57) ABSTRACT

Systems and methods for classifying product feedback by an electronic device are described. According to certain aspects, an electronic device may receive consumer feedback entries associated with various products, where each entry may include an initial classification. The electronic device may analyze each entry using a machine learning model to determine a subsequent classification for the entry. When there is a mismatch between classifications, the electronic device may present information associated with the entry for review by a user, where the user may specify a final classification for the entry, and the electronic device may update the machine learning model for use in subsequent analyses.

12 Claims, 17 Drawing Sheets

(56) References Cited

U.S. PATENT DOCUMENTS

| | | | |
|---|---|---|---|
| 10,067,760 B2* | 9/2018 | Ryali | G06F 8/20 |
| 10,235,453 B2* | 3/2019 | Simard | G06F 16/93 |
| 10,438,212 B1* | 10/2019 | Jilani | G06N 20/20 |
| 10,459,951 B2* | 10/2019 | Venkataraman | G06F 16/285 |
| 10,467,630 B2* | 11/2019 | Iyer | G06F 16/33 |
| 10,726,060 B1* | 7/2020 | Dutta | G06Q 30/0601 |
| 11,087,880 B1* | 8/2021 | Shah | G16H 50/20 |
| 11,238,079 B2* | 2/2022 | Simard | G06F 3/0482 |
| 11,276,040 B2* | 3/2022 | Muthuswamy Sivaraman | G06F 40/30 |
| 2004/0128321 A1* | 7/2004 | Hamer | G06Q 10/10 |
| 2005/0182695 A1 | 8/2005 | Lubow et al. | |
| 2006/0178905 A1 | 8/2006 | Ayers et al. | |
| 2007/0223699 A1* | 9/2007 | Jones | G06F 16/35 707/E17.089 |
| 2008/0208885 A1* | 8/2008 | Barber | G06F 40/30 707/999.102 |
| 2008/0313070 A1 | 12/2008 | Fell et al. | |
| 2012/0065932 A1* | 3/2012 | Catipon, Jr. | G06Q 10/109 702/178 |
| 2012/0158446 A1 | 6/2012 | Mayerle et al. | |
| 2012/0239596 A1* | 9/2012 | Lee | G06N 20/00 706/11 |
| 2012/0303558 A1* | 11/2012 | Jaiswal | G06N 20/00 706/12 |
| 2014/0052644 A1* | 2/2014 | Ott | G06Q 30/016 705/304 |
| 2014/0074513 A1 | 3/2014 | Bhatt et al. | |
| 2014/0129536 A1* | 5/2014 | Anand | G06Q 10/0635 707/723 |
| 2014/0136424 A1* | 5/2014 | Nakkana | G06Q 30/016 705/304 |
| 2014/0337209 A1 | 11/2014 | Maiya et al. | |
| 2015/0092928 A1* | 4/2015 | Jensen | G16H 50/70 379/45 |
| 2015/0235158 A1* | 8/2015 | Rungta | G06Q 10/06395 705/7.15 |
| 2016/0379281 A1* | 12/2016 | Laxmanan | G06Q 30/0282 705/347 |
| 2017/0032029 A1* | 2/2017 | Venkataraman | G06Q 30/016 |
| 2017/0075978 A1* | 3/2017 | Zhang | G06F 40/216 |
| 2017/0091844 A1* | 3/2017 | Yarvis | G06N 20/00 |
| 2017/0098257 A1 | 4/2017 | Keller | |
| 2017/0154292 A1* | 6/2017 | Venkataraman | G06Q 10/063114 |
| 2017/0212756 A1* | 7/2017 | Ryali | G06F 16/353 |
| 2017/0249384 A1* | 8/2017 | Kandylas | G06F 16/358 |
| 2017/0249642 A1 | 8/2017 | Burpulis et al. | |
| 2017/0249685 A1 | 8/2017 | Villa | |
| 2017/0316421 A1* | 11/2017 | Xu | G07C 5/006 |
| 2017/0330121 A1 | 11/2017 | Sullivan et al. | |
| 2018/0046972 A1 | 2/2018 | Sheth et al. | |
| 2018/0053116 A1* | 2/2018 | Cai | G06F 16/353 |
| 2018/0130050 A1 | 5/2018 | Taylor et al. | |
| 2018/0211260 A1* | 7/2018 | Zhang | G06N 20/00 |
| 2018/0260760 A1* | 9/2018 | Srivastava | G06Q 10/103 |
| 2018/0349817 A1* | 12/2018 | Goel | G06Q 10/0635 |
| 2019/0026653 A1* | 1/2019 | Gupta | G06Q 50/01 |
| 2019/0132191 A1* | 5/2019 | Mann | H04L 41/147 |
| 2019/0158366 A1* | 5/2019 | Higgins | G10L 25/63 |
| 2019/0244225 A1* | 8/2019 | Ravichandran | G06Q 30/0201 |
| 2019/0266070 A1* | 8/2019 | Bhandarkar | G06F 11/3072 |
| 2019/0318031 A1* | 10/2019 | Sim | G06F 16/345 |
| 2019/0349273 A1* | 11/2019 | Rikovic Tabak | H04L 41/16 |
| 2020/0065151 A1* | 2/2020 | Ghosh | H04L 41/5074 |
| 2020/0076846 A1* | 3/2020 | Pandian | G06F 3/04817 |
| 2020/0090087 A1* | 3/2020 | Singh | H04L 67/306 |
| 2020/0097883 A1* | 3/2020 | Meng | G06F 40/30 |
| 2020/0104752 A1* | 4/2020 | Meng | G06F 16/35 |
| 2020/0104774 A1* | 4/2020 | Sun | G06Q 10/06393 |
| 2020/0202302 A1* | 6/2020 | Rathod | G06V 30/40 |
| 2020/0204431 A1* | 6/2020 | Bahrami | G06F 16/355 |
| 2020/0218770 A1* | 7/2020 | Tu | G06F 16/953 |
| 2020/0250022 A1* | 8/2020 | Li | G06F 11/3006 |
| 2020/0327372 A1* | 10/2020 | Anschuetz | G06K 9/628 |
| 2021/0064824 A1* | 3/2021 | Ranatunga | H04L 51/212 |

OTHER PUBLICATIONS template.net, "template.net, Best Sentiment Analysis Tools & Sofwares." (2019) Template.net. Retrieved from the Internet on Sep. 13, 2019: https://www.template.net/business/tools/sentiment-analysis-tool/.

* cited by examiner

COMPLAINT MANAGER

FILTER

| SUBCATEGORY | SKU | REASON CODE | BUSINESS UNIT | BRAND | CATEGORY |
| STORE NUMBER | PDM | COMPLAINT NUMBER | VENDOR | DISTRIBUTION CENTER |

NOTES | CLEAR — 305

SELECTION
100 COMPLAINTS — 310

10614814 27-FEB 2019 — 311
968295
COXXXXXXO SHXXXXXXUT
CUSTOMER CALLED IN NEEDING ASSISTANCE WITH A COMPANY A BRAND PRODUCT. CUSTOMER STATED TRYING TO OPEN.... QUALITY — 312

10614684 27-FEB 2019
347656 2130
COXXXXXXRI LAXXXXXXUC
LUXXXXXXJ
THE PRODUCT DOESN'T WORK IT JUST DOESN'T DO ITS JOB. IM SEEING 100 PERCENT SATISFACTION GUARANTEE O... QUALITY

10614564 27-FEB 2019
517219 8175
GOXXXXXXLU LEXXXXXXES
NOXXXXXXI
COUPON SEQ #53670658344.CUSTOMER WAS NOT HAPPY WITH THE TASTE OF THE PRODUCT.CUSTOMER STATES THAT..... QUALITY

MENU
- HOME
- COMPLAINT
  - DASHBOARD
  - ANALYTICS
  - VERIFICATIONS
  - MANAGER
  - REPORTING
- PROTOCAL
- HELP & SUPPORT
- HIDE

DEMO COMPANY iON — 300

| | COMPLAINT REPORTING | | | | | | 🏪 DEMO COMPANY ⓜ |
|---|---|---|---|---|---|---|---|
| COMPLAINTS SUMMARY | | PDM | | MISSING COMPLAINTS | | SALES AND COMPLAINTS | |

12/24/2018 — 2/24/2019

SEARCH NOTE: [SEARCH]

| INCIDENTCREATED DATETIME | INCIDENT | SKU | DESCRIPTION | STORE | DISTRIBUTION CENTER NAME | REASON CODE | NOTE |
|---|---|---|---|---|---|---|---|
| 2/27/2019 7:43:03 PM | 10614814 | 968295 | COMPANYA NODRP NSL MST | | | QUALITY | CUSTOMER CALLED IN NEEDING ASSISTANCE WITH A COMPANY BRAND PRODUCT. CUSTOMER AFTER SEVERAL ATTEMPTS AND GOING THROUGH THE DIRECTIONS. CUSTOMER WAS ADVISED THE NEEDED AT THIS TIME. |
| 2/27/2019 7:15:52 PM | 10614684 | 347656 | COMPANYA PSNL WRM LUBE | 2130 | LUXXXXXXXJ | QUALITY | THE PRODUCT DOESN'T WORK IT JUST DOESN'T DO ITS JOB. IM SEEING 100 PERCENT SATISFACTION BACK TO THE STORE ALL RETURNS PROCESS AT STORE LEVEL SHE WOULD NEED A FORM OF ID W |
| 2/27/2019 6:54:19 PM | 10614564 | 517219 | GE OAT/RAIS CKIE | 8175 | NOXXXXXXXI | QUALITY | COUPON SEQ #5367065834. CUSTOMER WAS NOT HAPPY WITH THE TASTE OF THE PRODUCT WAS NOT SATISFACTORY. |
| 2/27/2019 6:09:17 PM | 10614223 | 360712 | B360 CTN BALL JMBO | | | QUALITY | CUSTOMER CALLED IN WANTING TO CHECK IF A COMPANYA BRAND PRODUCT HAS BEEN UPDATE SIZE AND PACKING BUT THE RECENT PRODUCT WITH THE SAME NAME AND PACKING BUT THE REGARDS TO THE PRODUCT NOT MEETING HER EXPECTATIONS ON THE CHANGE. CUSTOMER M PROVIDED NUMBER 5601806001 AND ANOTHER NUMBER STATING COMPANYA181667. |
| 2/27/2019 5:35:46 PM | 10613911 | 378919 | GE MIXED NUTS | 588 | VEXXXXXXXL | QUALITY | CUSTOMER CALLED IN REGARDING DISSATISFACTION OF A COMPANY A BRAND PRODUCT. CUSTOMER THE RECEIPT, THE CUSTOMER BECOME ANGRY THAT SHE HAD BEEN TRANSFERRED TO ME (BY RECEIVE A COUPON FOR THE AMOUNT OF THE PRODUCT AND THAT IT WAS HUMILIATING FOR HER LOOK INTO OFFERING HER EXTRA BUCKS. AS I PLACED HER ON HOLD TO CONTACT A SUPERVISOR |
| 2/27/2019 5:18:56 PM | 10613742 | 852652 | COMPANYA FOREHEAD THRM | | | QUALITY | CALLER STATES PURCHASED COMPANYA ITEM FEW YEARS AGO AND NOW GETTING ERROR MES VENDOR INFO; BEST MED IIC- NOW 180 INOVATIONS- CALLED VENDOR AND CAN ONLY LEAVE CAN'T GUARANTEE STORE WILL ACCEPT RETURN |
| 2/27/2019 5:06:06 PM | 10613602 | 213066 | COMPANYA PED ON ONTMNT | | | QUALITY | 1) COMPANYA MELATONIN (5mg) 2) COMPANYA DIAPER RASH OINTMENT (ZINC OXIDE 4 CUSTOMER RECEIVED THROUGH THE MAIL AND SAY WHEN SHE RECEIVED THE ITEMS THEY WHERE COME IN A CERTAIN TEMPERATURE AND IF THEY'RE STILL GOOD TO USE. I DID INFORM THE SU-PHARMACY TO FURTHER ASSIST HER ABOUT THE QUESTIONS FOR THOSE ITEMS. |
| 2/27/2019 4:53:37 PM | 10613447 | 710800 | COMPANYA 5HTP 100MG | | | RISK MGMT. | CUSTOMER FELT NAUSEATED AFTER TALKING THE PRODUCT. PILLS ARE NOW EXPIRED. PILLS WERE |
| 2/27/2019 4:51:42 PM | 10613426 | 300263 | COMPANYA | | | QUALITY | 1) COMPANYA MELATION / 5mg 2) COMPANYA DIAPER RASH OINTMET / ZIC |

Menu: HOME, COMPLAINT, DASHBOARD, ANALYTICS, VERIFICATIONS, MANAGER, REPORTING, ARCHIVE, PROTOCAL, HELP & SUPPORT, HIDE

TECHNOLOGIES FOR CLASSIFYING FEEDBACK USING MACHINE LEARNING MODELS

FIELD

The present disclosure is directed to classifying feedback related to various items such as consumer products. More particularly, the present disclosure is directed to platforms and technologies for training machine learning models associated with product feedback, and using the machine learning models to classify product feedback that originates from users or systems.

BACKGROUND

Individuals or consumers frequently purchase or order products or items for certain applications or uses. These products or items may be purchased from traditional "brick and mortar" stores, or may be ordered via e-commerce websites, applications, or other platforms offered by companies or other entities. These stores and companies generally enable the individuals to submit or provide feedback related to the products, or employ a system that learns through their purchasing behavior, where the feedback may be descriptive of various aspects of the products, such as the quality, safety, and usability of the products, the ordering or purchasing of the products, and any product warranties or policies, among other aspects. This feedback is useful to companies to assess how to improve, market, or sell the products, and useful to other consumers who may be contemplating purchasing the products.

However, existing feedback compilation systems are limited. For instance, some e-commerce platforms enable individuals to rate products (e.g., on a scale from one (1) star to five (5) stars) and write reviews of products, however the companies that offer the e-commerce platforms, as well as other consumers, must manually review the product ratings and reviews when attempting to assess product offering changes and product purchase decisions. Additionally, the amount of information available to companies to make certain product decisions is limited.

Accordingly, there is an opportunity for platforms and technologies that effectively and efficiently analyze and classify product feedback for effective and efficient assessment.

SUMMARY

In an embodiment, a computer-implemented method for classifying product feedback is provided. The method comprises: training, by a processor, a machine learning model using a training dataset comprising a set of consumer feedback training entries associated with a set of products, including classifying each consumer feedback training entry of the set of consumer feedback training entries as one of a first category or a second category; accessing, by the processor, a consumer feedback entry associated with a product of the set of products, wherein the consumer feedback entry comprises an initial classification as one of the first category or the second category; applying the machine learning model to the consumer feedback entry to classify the consumer feedback entry as a subsequent classification as the other of the first category or the second category; and displaying, in a user interface, an indication of the consumer feedback entry, the initial classification, and the subsequent classification.

In another embodiment, a system for classifying product feedback is provided. The system comprises a processor, a user interface, and a non-transitory computer-readable memory coupled to the processor and the user interface, and storing instructions thereon. The instructions, when executed by the processor, cause the processor to: train the machine learning model using a training dataset comprising a set of consumer feedback training entries associated with a set of products, including classifying each consumer feedback training entry of the set of consumer feedback training entries as one of a first category or a second category, access a consumer feedback entry associated with a product of the set of products, wherein the consumer feedback entry comprises an initial classification as one of the first category or the second category, apply the machine learning model to the consumer feedback entry to classify the consumer feedback entry as a subsequent classification as the other of the first category or the second category, and cause the user interface to display an indication of the consumer feedback entry, the initial classification, and the subsequent classification.

In a further embodiment, a non-transitory computer-readable storage medium having stored thereon a set of instructions, executable by a processor, for classifying product feedback is provided. The instructions may include: instructions for training a machine learning model using a training dataset comprising a set of consumer feedback training entries associated with a set of products, including classifying each consumer feedback training entry of the set of consumer feedback training entries as one of a first category or a second category; instructions for accessing a consumer feedback entry associated with a product of the set of products, wherein the consumer feedback entry comprises an initial classification as one of the first category or the second category; instructions for applying the machine learning model to the consumer feedback entry to classify the consumer feedback entry as a subsequent classification as the other of the first category or the second category; and instructions for displaying, in a user interface, an indication of the consumer feedback entry, the initial classification, and the subsequent classification.

BRIEF DESCRIPTION OF THE FIGURES

FIGS. 2A-2C depict example interfaces associated with specifying classifications for feedback entries having mismatched classifications, in accordance with some embodiments.

FIGS. 3A-3C depict example interfaces associated with feedback entries and information related thereto, in accordance with some embodiments.

FIGS. 6A-6D depicts example reportings associated with the analysis of feedback entries, in accordance with some embodiments.

DETAILED DESCRIPTION

Figure 1A:
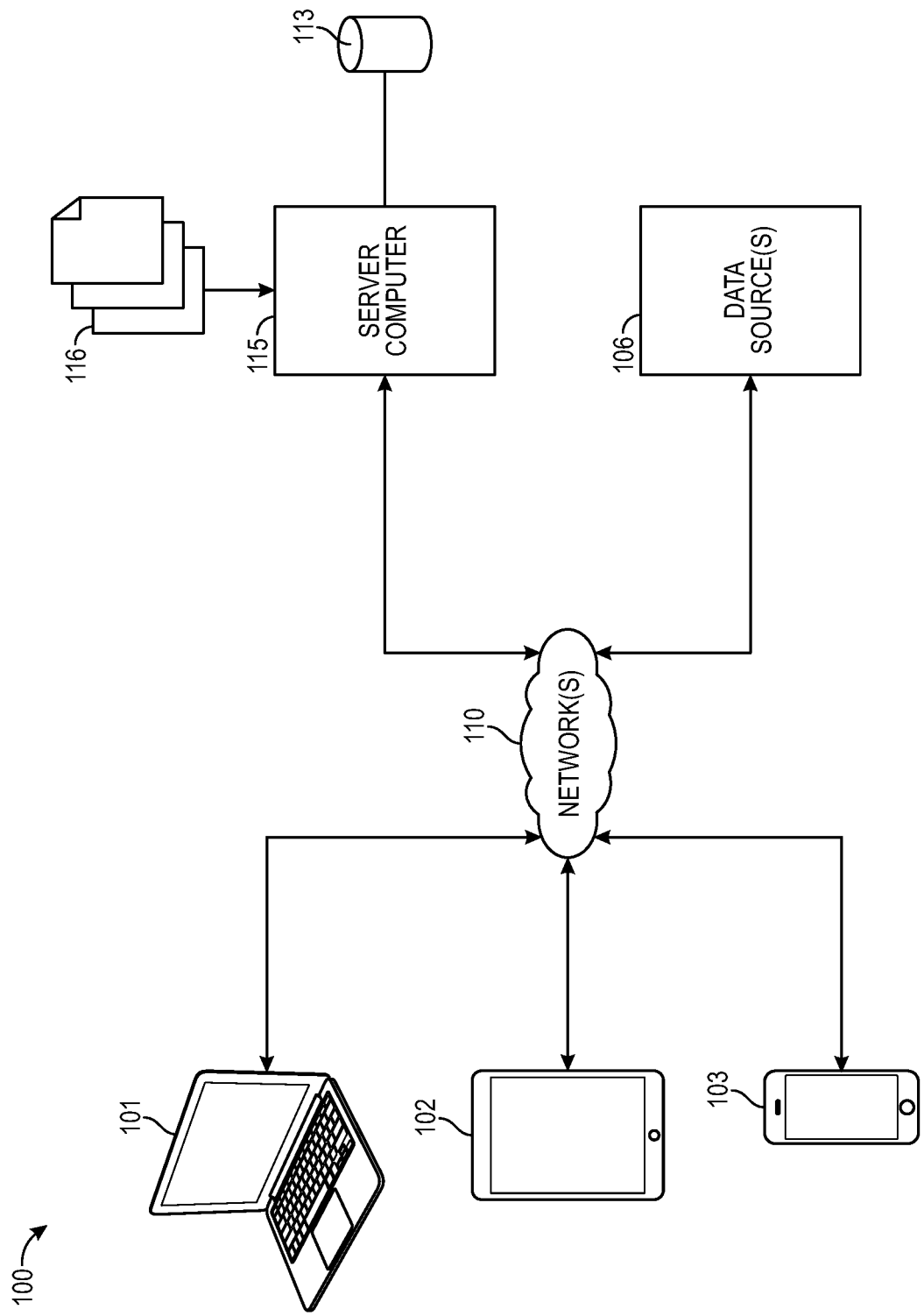
FIG. 1A depicts an overview of components and entities associated with the systems and methods, in accordance with some embodiments.

The present embodiments may relate to, inter alia, platforms and technologies for dynamically categorizing feedback related to products. According to certain aspects, an individual (or entity) may submit or provide feedback associated with a product(s) that the individual may have recently purchased, contemplated purchasing, consumed, used, and/or the like. Generally, the feedback may be descriptive of various aspects of the products, such as the quality, safety, and usability of the products, the ordering or purchasing of the products, and any product warranties or policies, among other aspects. Additionally, the feedback may be embodied as electronic data (e.g., an electronic document), and may be input by individuals via respective electronic devices, or may be communicated (e.g., dictated) to another user and compiled by the user, such as a user associated with a company.

Systems and methods may initially use various machine learning techniques to train a machine learning model(s) (or more generally, a mathematical model(s)) using a training dataset, where the training dataset may include a set of feedback entries related to a set of products as well as a classification or category for each of the feedback entries (e.g., positive or negative). In embodiments, each feedback entry may include textual (i.e., alphanumeric) content descriptive of one or more aspects of one or more products, and the classification or category may be from a set of predetermined classifications or categories. The systems and methods may then store the trained machine learning model(s) for subsequent use. It should be understood that the terms "category" (and variations thereof) and "classification" (and variations thereof) are used interchangeably throughout this description.

The systems and methods may receive or otherwise access product feedback, in the form of a set of feedback entries, that is submitted by or otherwise prepared by individuals or generated by systems. Each feedback entry may have an initial classification that is initially designated by another user (e.g., a user associated with the company that sells the product), or by the individual who prepares or submits the feedback entry. The systems and methods may analyze the product feedback using the machine learning model(s). In analyzing the product feedback, the systems and methods may output a subsequent classification for each entry, where the subsequent classification may be the same as or different from the initial classification. Although the embodiments describe classifying feedback that relates to products, it should be appreciated that the systems and methods and functionalities thereof may be applied to feedback that relates to services. Additionally, the embodiments use the term "consumer" to describe an individual that may initially produce or generate product feedback, and it should be appreciated that the term "consumer" is synonymous with any customer, purchaser, user, or individual who may use or be associated with products or services.

In embodiments, the systems and methods may "flag" certain feedback entries for subsequent review by an appropriate individual, such as if the subsequent classification of a feedback entry does not match the initial classification of the feedback entry, or if the systems and methods are not able to confidently classify the feedback entries (e.g., when the feedback entries include ambiguous content). The appropriate individual may review any flagged entries to determine or select an accurate classification for each of the flagged entries. Additionally, the systems and methods may support a data visualization engine that may generate various user interfaces for review by appropriate individuals to assess trends, gain additional insights, and perform additional assessments.

The systems and methods therefore offer numerous benefits. In particular, the use of various machine learning techniques enable the systems and methods to accurately and dynamically categorize product feedback. Additionally, entities such as companies and corporations are afforded the benefit of accurately classifying or categorizing product feedback, and reviewing and assessing properly-classified feedback, so the entities may effectively and efficiently determine how to modify certain aspects of the products, such as marketing, manufacturing, designing, selling, and/or the like. Additionally, the entities may be provided with data visualizations generated from the feedback categorization, from which additional useful information may be determined. Further, the systems and methods are capable of effectively and efficiently classifying and categorizing increasing amounts of data while achieving greater efficiently and accuracy. Still further, the systems and methods may learn about the variations of the product feedback based on the variations of the consumers in various regions (i.e., how different regions perceive value in products/services). Moreover, consumers are afforded the benefit of accessible, compiled information, from which product purchasing decisions may be made. It should be appreciated that additional benefits are envisioned.

The systems and methods discussed herein address a challenge that is particular to supply chain management. In particular, the challenge relates to a difficulty in accurately and effectively assessing deficiencies in various stages of the supply chain lifecycle. Conventionally, individuals must manually review multiple sets of data from multiple sources to identify potential product issues, which typically occurs after the issues have emerged. However, these conventional methods are often time consuming, ineffective, and/or expensive. The systems and methods offer improved capabilities to solve these problems by dynamically and accurately classifying product feedback, which results in data that effectively identifies product issues, including those issues that may be effectively addressed before further escalation. Further, because the systems and methods employ communication between and among multiple devices, the systems and methods are necessarily rooted in computer technology in order to overcome the noted shortcomings that specifically arise in the realm of supply chain management.

FIG. 1A illustrates an overview of a system 100 of components configured to facilitate the systems and methods. It should be appreciated that the system 100 is merely an example and that alternative or additional components are envisioned.

As illustrated in FIG. 1A, the system 100 may include a set of electronic devices 101, 102, 103. Each of the electronic devices 101, 102, 103 may be any type of electronic device such as a mobile device (e.g., a smartphone), desktop computer, notebook computer, tablet, phablet, GPS (Global Positioning System) or GPS-enabled device, smart watch, smart glasses, smart bracelet, wearable electronic, PDA (personal digital assistant), pager, computing device configured for wireless communication, and/or the like. In embodiments, any of the electronic devices 101, 102, 103 may be an electronic device associated with an entity such as a company, business, corporation, or the like (e.g., a server computer or machine).

Each of the electronic devices 101, 102, 103 may be used by any individual or person (generally, a user). According to embodiments, the user may use the respective electronic device 102, 102, 103 to input feedback associated with a product(s). The product(s) may be offered for sale or otherwise made available for purchase or use by a business, company, service provider, or the like. For example, a product may be a certain remote-controlled vehicle for sale by a "big box" retailer, or a certain brand of toothpaste for sale by a convenience store. Although the embodiments discuss the sale of products, it should be appreciated that the systems and methods, and functionalities, may extend to services offered by businesses, companies, service providers, or the like.

In embodiments, the feedback that is input or generated by the users may be any textual (i.e., alphanumeric) description of a given product, where the feedback may include a combination of positive, negative, or neutral description or feedback of a certain aspect(s) of the product. In embodiments, the user may input feedback textually or audibly (e.g., via dictation). Further, in embodiments, the user may provide the feedback to an external user (e.g., via chat or another type of electronic communication, or via a phone call such as a call center service call), such as an external user associated with the business, company, service provider, or the like, which markets, manufactures, or sells the product, or is otherwise involved in the supply chain of the product.

The electronic devices 101, 102, 103 may communicate with a server computer 115 via one or more networks 110. The server computer 115 may be associated with an entity such as a company, business, corporation, or the like, which markets, manufactures, or sells the product, or is otherwise involved in the supply chain of the product. The server computer 115 may include various components that support telecommunication with the electronic devices 101, 102, 103. In embodiments, the electronic devices 101, 102, 103 may transmit or communicate, via the network(s) 110, the inputted feedback to the server computer 115. The server computer 115 may additionally communicate with one or more data sources 106 via the network(s) 110. In embodiments, the data source(s) 106 may compile, store, or otherwise access any additional feedback associated with a product(s), and send the additional feedback to the server computer 115.

In embodiments, the network(s) 110 may support any type of data communication via any standard or technology (e.g., GSM, CDMA, VoIP, TDMA, WCDMA, LTE, EDGE, OFDM, GPRS, EV-DO, UWB, Internet, IEEE 802 including Ethernet, WiMAX, Wi-Fi, Bluetooth, and others). Further, in embodiments, the network(s) 110 may be any telecommunications network that may support a telephone call between the electronic devices 101, 102, 103 and the server computer 115.

According to embodiments, the server computer 115 (or a user thereof) may initially classify feedback entries received or communicated from the electronic devices 101, 102, 103. In a particular scenario, a user associated with the server computer 115 may review each feedback entry and classify the feedback entry (e.g., either as "Risk" or "Quality"), and the server computer 115 may store the initial classification for each feedback entry. In another scenario, a feedback entry received from the electronic devices 101, 102, 103 may indicate an initial classification of the feedback entry (e.g., selected by a user of the electronic devices 101, 102, 103), where the server computer 115 may additionally or alternatively store this initial classification(s) of the feedback entry(ies). Although the present embodiments describe the feedback entries as originating from consumers, it should be appreciated that the feedback entries may be generated by various systems or devices (e.g., the server computer 115 or another entity or device), based on processing or analyzing consumer purchase behavior and/or information describing use of products by consumers.

According to embodiments, the server computer 115 may employ various machine learning techniques, calculations, algorithms, and the like to generate a machine learning model associated with feedback for a set of products. The server computer 115 may initially train the machine learning model using a training dataset 116. Additionally, the server computer 115 may classify, using the machine learning model, the feedback entries that are received from any of the electronic devices 101, 102, 103 or the data source(s) 106.

The machine learning model may generate or output a classification, of a plurality of classifications, for each feedback entry (e.g., a training entry), where the plurality of classifications may be labeled or customized according to various conventions. In one example convention, a first classification may be "Quality" for a feedback entry that is considered positive, and a second classification may be "Risk" for a feedback entry that is considered negative (i.e., a binary classification). It should be appreciated that different binary and non-binary classifications and classification conventions are envisioned. For example, a convention may classify a sentiment for product descriptions, where the sentiment may be on a scale from "1" (highly negative) to "5" (highly positive). This subsequent classification of the feedback entries by the server computer 115 when analyzed using the machine learning model may or may not be the same as the initial classification of the feedback entries. The subsequent classifications of the feedback entries may be automatically and continuously re-input into the machine learning model for continuous optimizing based on the initial and subsequent classifications, and for use in analyzing subsequent feedback entries. The enhanced machine learning models may be used to identify and highlight important product topics and trends (e.g., unintended use or abuse of products), improve product quality, optimize business processes, and increase consumer satisfaction, among other benefits and uses, whereby the data from such analyses may be shared with supply-chain partners (e.g., manufacturers, retailers, etc.).

The server computer 115 may be configured to interface with or support a memory or storage 113 capable of storing various data, such as in one or more databases or other forms of storage. According to embodiments, the storage 113 may store data or information associated with the machine learning models that are generated by the server computer 115. Additionally, the server computer 115 may access the data associated with the stored machine learning models to classify any received feedback entries.

Although depicted as a single server computer 115 in FIG. 1A, it should be appreciated that the server computer 115 may be in the form of a distributed cluster of computers, servers, machines, or the like. In this implementation, the entity may utilize the distributed server computer(s) 115 as part of an on-demand cloud computing platform. Accordingly, when the electronic devices 101, 102, 103 interface with the server computer 115, the electronic devices 101, 102, 103 may actually interface with one or more of a number of distributed computers, servers, machines, or the like, to facilitate the described functionalities.

Figure 1B:
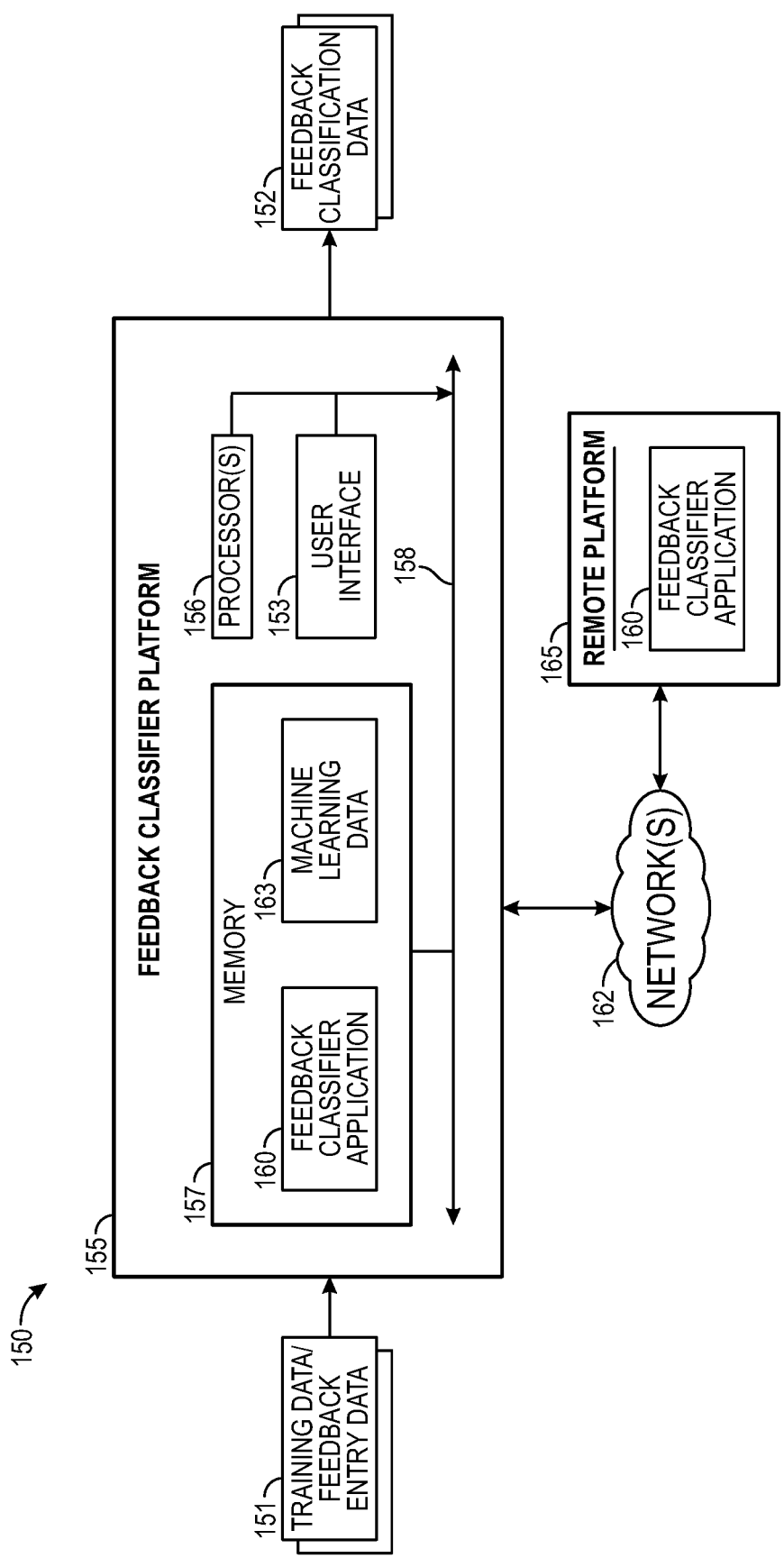
FIG. 1B depicts an overview of certain components configured to facilitate the systems and methods, in accordance with some embodiments.

Although three (3) electronic devices 101, 102, 103, and one (1) server computer 115 are depicted in FIG. 1A, it should be appreciated that greater or fewer amounts are envisioned. For example, there may be multiple server computers, each one associated with a different entity. FIG. 1B depicts more specific components associated with the systems and methods.

FIG. 1B an example environment 150 in which initial training dataset or feedback entry data 151 is processed into feedback classification data 152 via a feedback classifier platform 155, according to embodiments. The feedback classifier platform 155 may be implemented on any computing device, including the server computer 115 (or in some implementations, one or more of the electronic devices 101, 102, 103) as discussed with respect to FIG. 1A. Components of the computing device may include, but are not limited to, a processing unit (e.g., processor(s) 156), a system memory (e.g., memory 157), and a system bus 158 that couples various system components including the memory 157 to the processor(s) 156.

In some embodiments, the processor(s) 156 may include one or more parallel processing units capable of processing data in parallel with one another. The system bus 158 may be any of several types of bus structures including a memory bus or memory controller, a peripheral bus, or a local bus, and may use any suitable bus architecture. By way of example, and not limitation, such architectures include the Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

The feedback classifier platform 155 may further include a user interface 153 configured to present content (e.g., the content of feedback entries and information associated therewith). Additionally, a user may make selections to the content via the user interface 153, such as to navigate through different information, select categories for feedback entries, and/or other actions. The user interface 153 may be embodied as part of a touchscreen configured to sense touch interactions and gestures by the user. Although not shown, other system components communicatively coupled to the system bus 158 may include input devices such as cursor control device (e.g., a mouse, trackball, touch pad, etc.) and keyboard (not shown). A monitor or other type of display device may also be connected to the system bus 158 via an interface, such as a video interface. In addition to the monitor, computers may also include other peripheral output devices such as a printer, which may be connected through an output peripheral interface (not shown).

The memory 157 may include a variety of computer-readable media. Computer-readable media may be any available media that can be accessed by the computing device and may include both volatile and nonvolatile media, and both removable and non-removable media. By way of non-limiting example, computer-readable media may comprise computer storage media, which may include volatile and nonvolatile, removable and non-removable media implemented in any method or technology for storage of information such as computer-readable instructions, routines, applications (e.g., a feedback classifier application 160), data structures, program modules or other data. Computer storage media may include, but is not limited to, RAM, ROM, EEPROM, FLASH memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the processor 156 of the computing device.

The feedback classifier platform 155 may operate in a networked environment and communicate with one or more remote platforms, such as a remote platform 165, via a network(s) 162, such as a local area network (LAN), a wide area network (WAN), telecommunications network, or other suitable network. The platform 165 may be implemented on any computing device, including one or more of the electronic devices 101, 102, 103, or the server computer 115 as discussed with respect to FIG. 1A, and may include many or all of the elements described above with respect to the platform 155. In some embodiments, as will be described herein, the feedback classifier application 160 as will be further described herein may be stored and executed by the remote platform 165 instead of by or in addition to the platform 155.

The feedback classifier application 160 may employ machine learning techniques such as, for example, a regression analysis (e.g., a logistic regression, linear regression, or polynomial regression), k-nearest neighbors, decisions trees, random forests, boosting, neural networks, support vector machines, deep learning, reinforcement learning, Bayesian networks, or the like. When the data 151 is a training dataset, the feedback classifier application 160 may analyze/process the data 151 to generate the machine learning model for storage as part of machine learning data 163 that may be stored in the memory 157. In embodiments, each training feedback entry included in the training dataset 151 may have an associated classification (e.g., "Risk" or "Quality"), which is stored as part of the machine learning model.

When the data 151 is feedback entry data, each corresponding feedback entries may indicate an initial classification, such as an initial classification selected by an originating user or determined by an external user. The feedback classifier application 160 may analyze or process the entry (ies) included in the feedback entry data 151 using the machine learning model to classify each entry, and generate an output for each entry embodied as the feedback classification data 152. According to embodiments, the feedback classification data 152 may identify the entry as well as the classification for the entry, where the classification may be one of a plurality of categories.

In some situations, the classification for a given feedback entry as determined by the feedback classifier application 160 may not match an initial classification of the feedback entry, such as an initial classification that is determined by an external user. For example, a feedback entry may be initially classified as "Risk" category by an external user who reviews the feedback entry, and the feedback classifier application 160 may determine, from the machine learning model analysis, that the feedback entry should be classified as "Quality" category. Accordingly, the feedback classifier application 160 may "flag" any entries having mismatched classifications, for later review by a user of the feedback classifier platform 155. Additionally or alternatively, the feedback classifier application 160 may flag a particular entry when the feedback classifier application 160 is unable to classify the entry (e.g., due to incomplete information), or classifies an entry with a degree of confidence that does not meet a threshold level. The feedback classification data 152 may indicate feedback entries and, for each feedback entry, the initial classification and the subsequent classification determined by the feedback classifier application 160, and an indication of whether there is a mismatch between classifications.

After classifying a particular entry from the feedback data 151, the feedback classifier application 160 may add, to the machine learning model, the results from the classification so that the feedback classifier application 160 may use the updated machine learning model in subsequent feedback entry classifications. Generally, each of the data 151 and the data 152 may be embodied as any type of electronic document, file, template, etc., that may include various textual content and, for the data 152, an identification of the classification(s) for each feedback entry, and may be stored in memory as program data in a hard disk drive, magnetic disk and/or optical disk drive in the feedback classifier platform 155 and/or the remote platform 165.

The feedback classifier application 160 (or another component) may cause the feedback classification data 152 (and, in some cases, the training or feedback entry data 151) to be displayed on the user interface 153 for review by the user of the feedback classifier platform 155. The user may select to review and/or modify the displayed data. For instance, when a particular entry is flagged, the user may, via the user interface 153, review the flagged entry, and input or override a classification for the entry. For example, if the initial classification of an entry is "Quality" and the feedback classifier application 160 classifies the entry as "Risk," the user may review the entry and determine that the "Quality" category is more accurate, and designate the entry as "Quality". The feedback classifier application 160 may update the machine learning model stored in the machine learning data 163 to reflect any revised or updated classifications specified by the user, for subsequent use by the feedback classifier application 160.

In general, a computer program product in accordance with an embodiment may include a computer usable storage medium (e.g., standard random access memory (RAM), an optical disc, a universal serial bus (USB) drive, or the like) having computer-readable program code embodied therein, wherein the computer-readable program code may be adapted to be executed by the processor 156 (e.g., working in connection with an operating systems) to facilitate the functions as described herein. In this regard, the program code may be implemented in any desired language, and may be implemented as machine code, assembly code, byte code, interpretable source code or the like (e.g., via Golang, Python, Scala, C, C++, Java, Actionscript, Objective-C, Javascript, CSS, XML). In some embodiments, the computer program product may be part of a cloud network of resources.

FIGS. 2A-2C, 3A-3C, 4, 5A-5C, and 6A-6D depict example interfaces associated with the systems and methods. In embodiments, the interfaces may be displayed by a computing device in a user interface, such as the user interface 153 as discussed with respect to FIG. 1B. Additionally, the interfaces may be accessed and reviewed by a user of the platform (e.g., the platform 155), where the user may make selections, submit entries or modifications, or facilitate other functionalities.

Figure 2A:
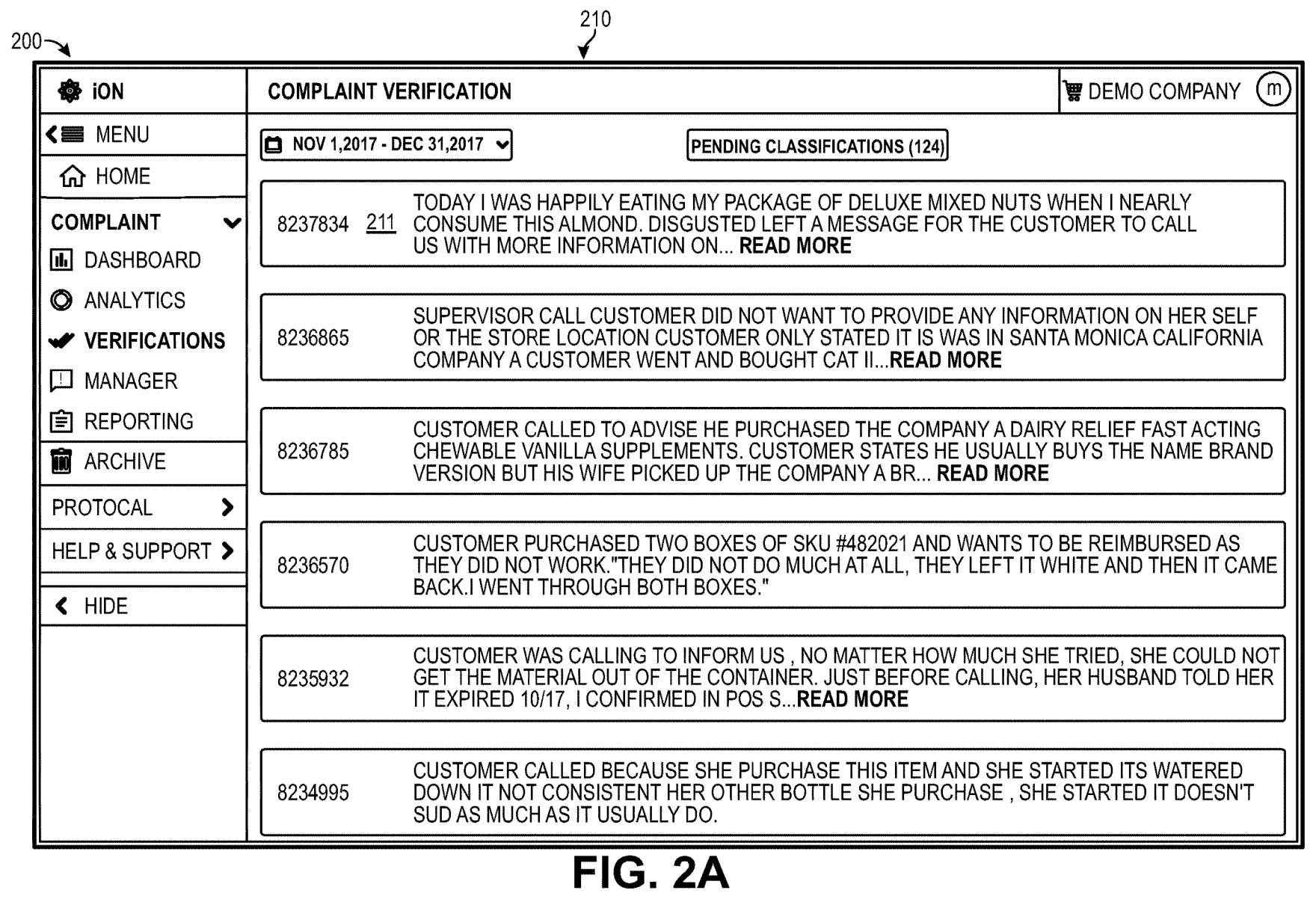

FIG. 2A depicts an interface 200 associated with the systems and methods. In particular, the interface 200 depicts a "Verifications" feature that may enable a user to review certain consumer feedback entries. The interface 200 may indicate a set of feedback entries 210 that may need to be reviewed, modified, reconciled, and/or the like. For example, as depicted in FIG. 2A, there are 124 "pending classifications" (i.e., feedback entries). Each of the set of feedback entries 210 may indicate conflicting classifications or categories, where an initial classification or category was originally assigned by an external user (or otherwise associated with the feedback entry), and a subsequent classification or category was determined by the machine learning model, where the initial classification or category does not match the subsequent classification or category. For example, a feedback entry 211 is for feedback entry number 8237834, and includes a mismatched classification.

Figure 2B:
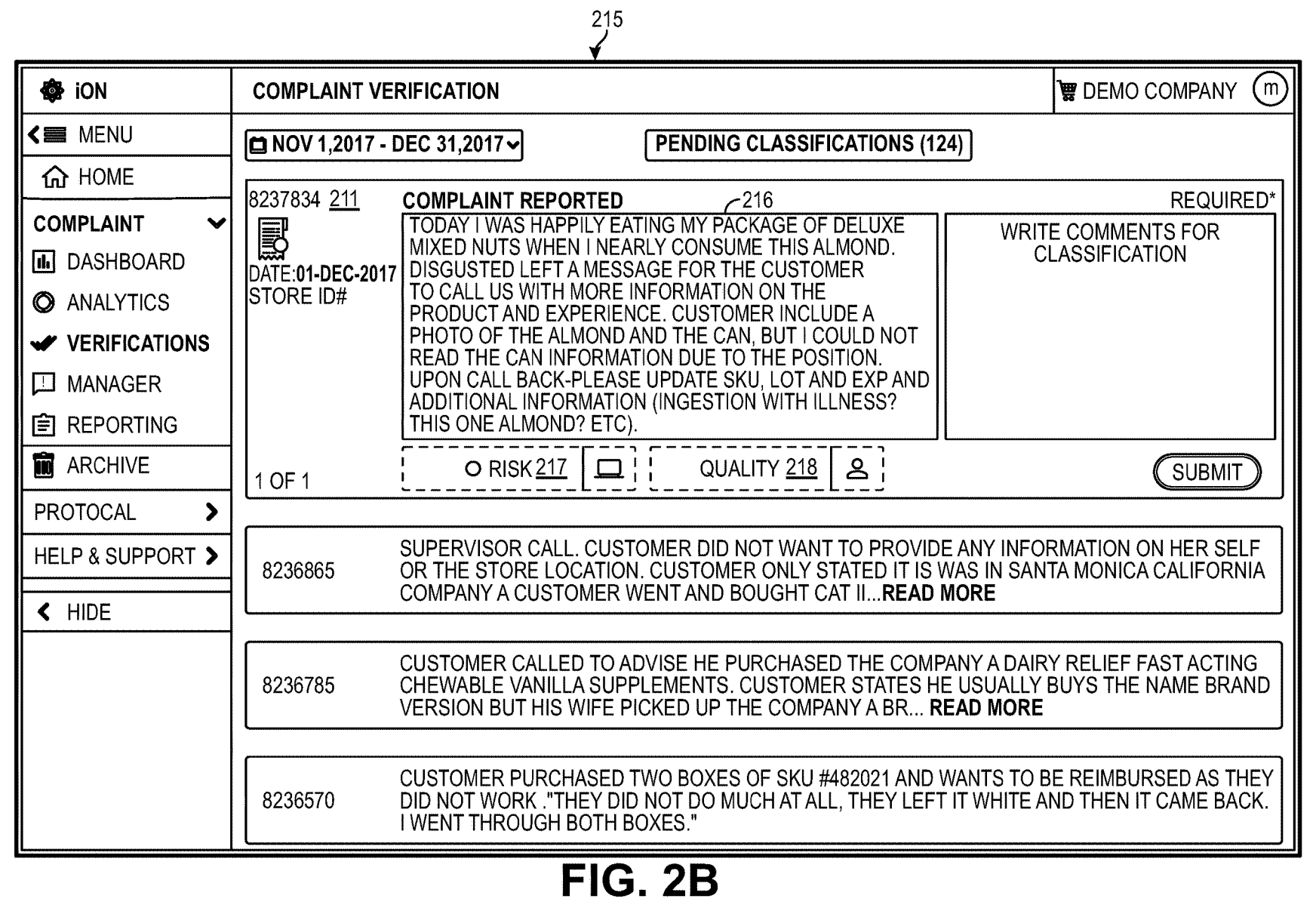

FIG. 2B depicts an interface 215 that the computing device may display in response to the user selecting the feedback entry 211. The interface 215 indicates a description 216 included in the feedback entry 211, an indication 217 of how the machine learning model classified the feedback entry 211 (as shown: "Risk"), and an indication 218 of how the feedback entry 211 was initially classified (as shown: "Quality"). The user may review the description 216 and determine how to accurately classify the feedback entry 211 (i.e., as "Risk" or "Quality"). The classification by the user may be referred to herein as the "final classification."

Figure 2C:

The description 216 indicates that the product (gold emblem mixed nuts) included an almond that left the purchaser "disgusted." Accordingly, the user may determine that the feedback entry 211 should be classified as "Risk," and may accordingly select a "Risk" selection 220 and enter comments into a comment box 221, as depicted in FIG. 2C. The interface of FIG. 2C further enables to select a "Submit" selection 222 that, when selected, causes the computing device to classify the feedback entry 211 according to the selection 220, and store the classified feedback in association with the machine learning model. Accordingly, the feedback entry 211 is property classified within the machine learning model such that subsequent feedback entry analyses using the updated model may be more accurate, which may lead to a reduced amount of pending classifications (i.e., mismatched classifications). Generally, this enables the platform 155 to undergo algorithmic improvement (i.e., supervised learning).

In certain embodiments, information associated with any reclassifications or modifications may be generated, compiled, and provided to any third-party entities (e.g., an entity from which feedback entries originate). Thus, the third-party entities may review and assess the information to determine how to improve operations. For example, if the data indicates that a particular external user who initially classifies feedback entries is consistently having his/her classifications overridden or modified, then the third-party entities may determine that the particular external user may need additional training.

FIG. 3A depicts an interface 300 associated with a "Manager" feature that may enable a user to review certain consumer feedback entries. The interface 300 may indicate a set of feedback entries 310 that have a classification or category on which the machine learning model and the external user agreed (e.g., each feedback entry was classified as "Quality" or "Risk" by each of the machine learning model and the external user). The interface 300 may further include a set of filters 305 that the user may use to sort or filter the set of feedback entries 310, where the user may set or modify various of the set of filters 305.

Each of the set of feedback entries 310 may indicate a classification or category that was agreed upon by the machine learning model and the external user. For example, a feedback entry 311 is associated with a certain product and indicates a category 312 "Quality". The interface 300 may enable the user to select any of the feedback entries 310 to access or review additional information associated with the feedback entry and/or the product associated therewith.

Figure 3B:
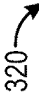

When the user selects the feedback entry 311, the computing device may display an interface 320 as depicted in FIG. 3B, where the interface 320 indicates various information 321 associated with the feedback entry 311 and/or the product associated therewith. In particular, the information 321 includes product information (SKU, product description, brand, category, sub-category, lot ID, and expiry date), and vendor information (vender ID, store ID, distribution center, and email address). The interface 320 may enable the user to change (322) or archive (323) the category, and edit (324) any or all of the information 321.

Figure 3C:

FIG. 3C depicts an interface 330 depicting additional information 325 associated with the feedback entry 311 and/or the product associated therewith (i.e., the additional information 325 is a continuation of the information 321 of FIG. 3B). The additional information 325 includes various details associated with the feedback entry 311 (namely, an interaction type, a call type, a reason, a complaint code, body part damage information, an action taken, and notes). The interface 330 may enable the user to enter comments via a comments selection 326.

According to embodiments, the computing device may automatically match and associate received feedback entries with the information depicted in the interfaces 320, 330 of FIGS. 3B and 3C. In one scenario, the feedback entry data may include any associated information (e.g., product information, vendor information, etc.). In another scenario, the computing device may analyze a feedback entry to automatically determine (e.g., with a confidence level) the product that is being referenced in the feedback entry. For example, if a feedback entry a toothpaste of a certain color, the computing device may identify a known toothpaste of the referenced color, and may automatically associate the toothpaste product information with the feedback entry.

Additionally, in embodiments, the computing device may determine how to manage any products or vendors based on the feedback entries 310 (and/or other feedback entries). For example, the computing device may determine that the feedback entries 310 include a certain number or percentage of "Risk" categories for a given product, in which case the computing device or a user thereof may initiate contact with an associated vendor, which may determine to institute a recall for the product. As another example, the computing device may determine that the feedback entries 310 indicate that a certain vendor has a threshold amount or percentage of feedback entries having a "Risk" category for one or more products, in which case the computing device or a user thereof may initiate contact with the vendor in an attempt to notify the vendor of the identified issue(s) and/or resolve the identified issue(s).

Figure 4:
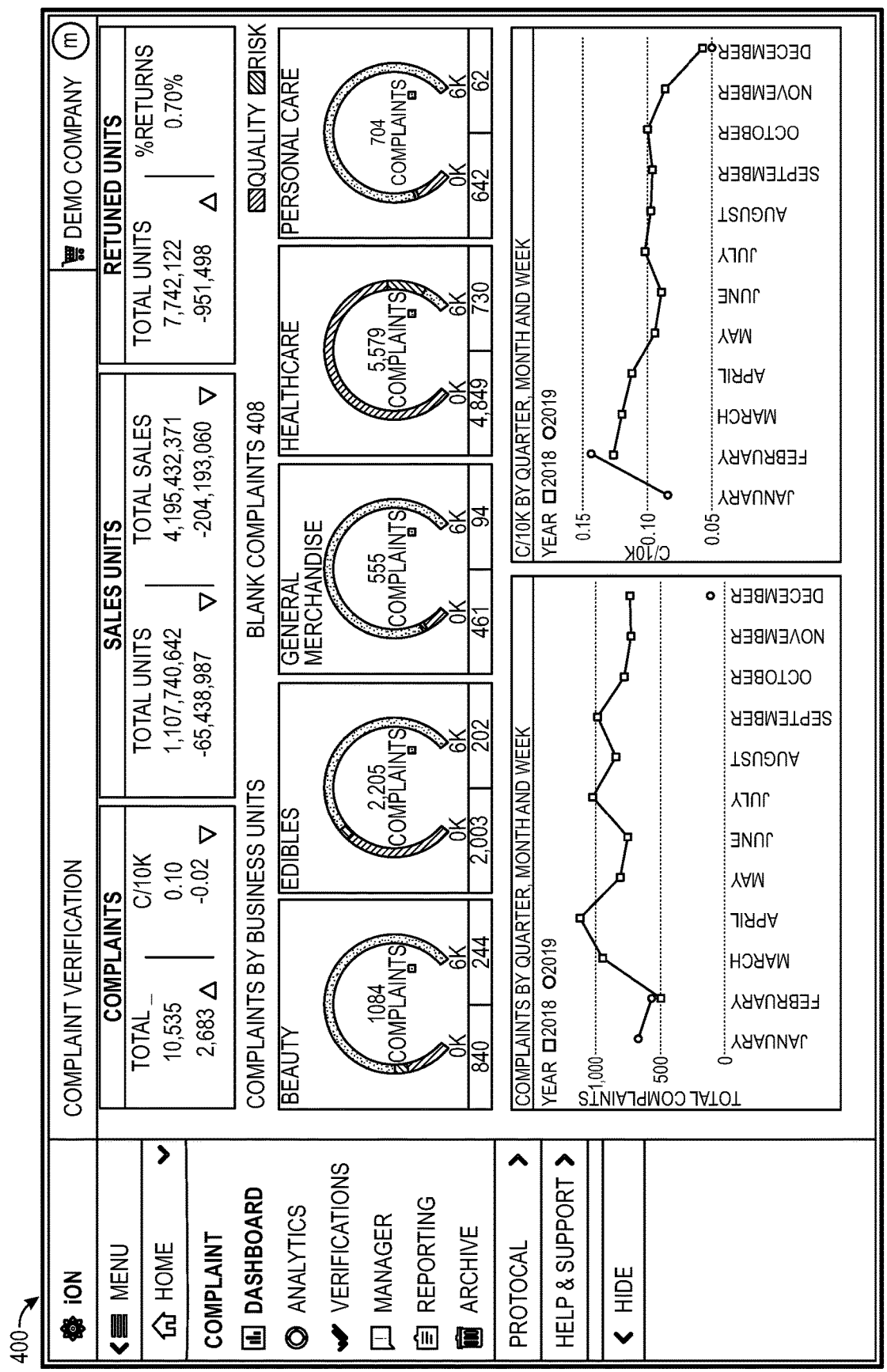
FIG. 4 depicts example charts and graphs associated with the analysis of feedback entries, in accordance with some embodiments.

FIG. 4 depicts an interface 400 associated with a "Dashboard" feature that includes certain data, charts, and the like associated with feedback entries, associated products, associated vendors, and/or the like. In particular, as depicted in FIG. 4, the interface 400 indicates such information as total complaints, complaint rate, product sales information, product return information, complaints by business unit, and complaints over time. In embodiments, the information of the interface 400 may be filtered (e.g., by date), and/or reviewed in further detail.

Figure 5A:
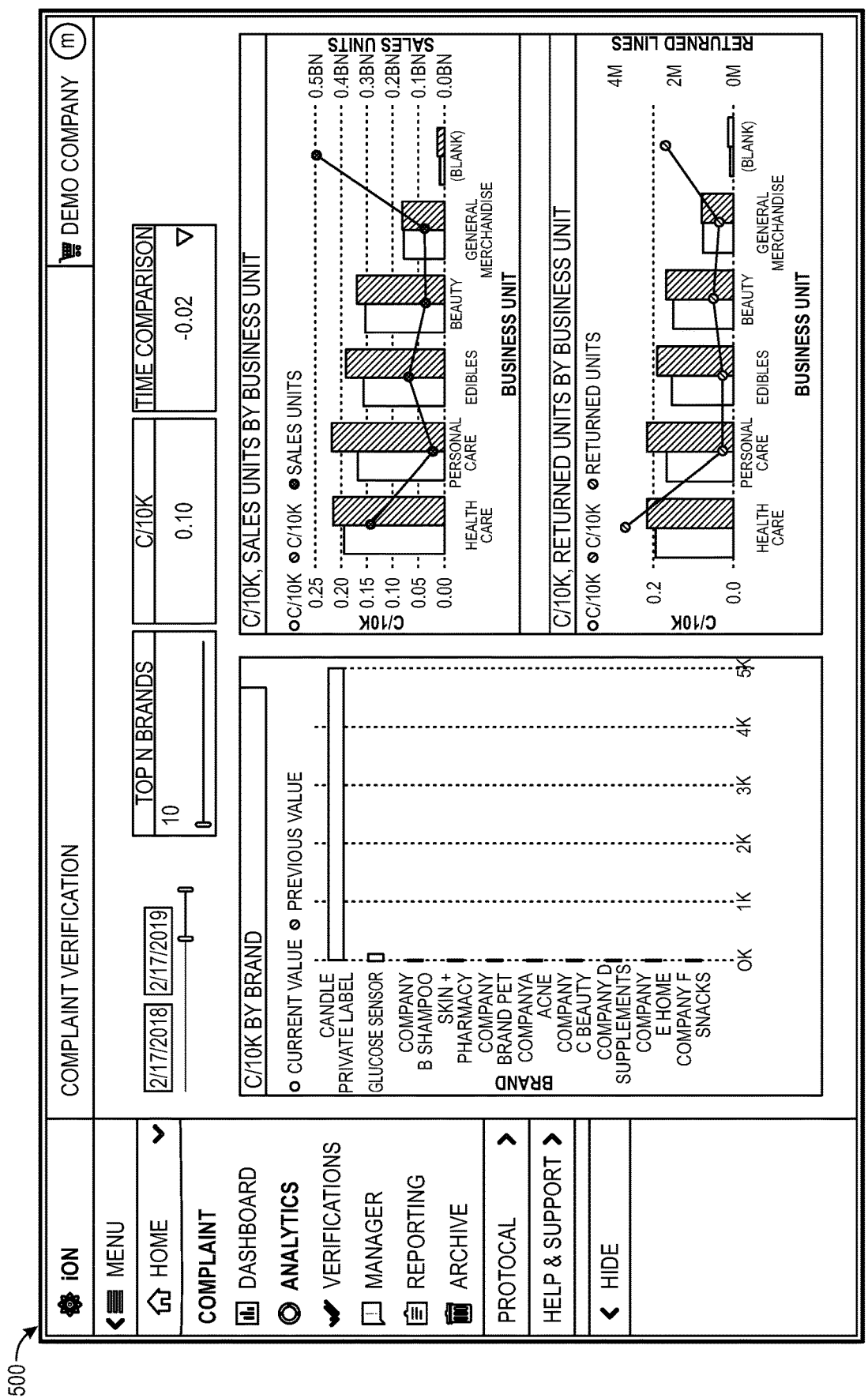
FIGS. 5A-5C depict additional example charts and graphs associated with the analysis of feedback entries, in accordance with some embodiments.

FIG. 5A depicts an interface 500 associated with an "Analytics" feature that includes certain data, charts, and the like associated with feedback entries, associated products, associated vendors, and/or the like. In particular, the interface 500 of FIG. 5A indicates a complaint rate (e.g., complaints per 10,000 sales), which can be segmented into complaint rate by brand, complaint rate by business unit, and return rate by business unit.

Figure 5B:
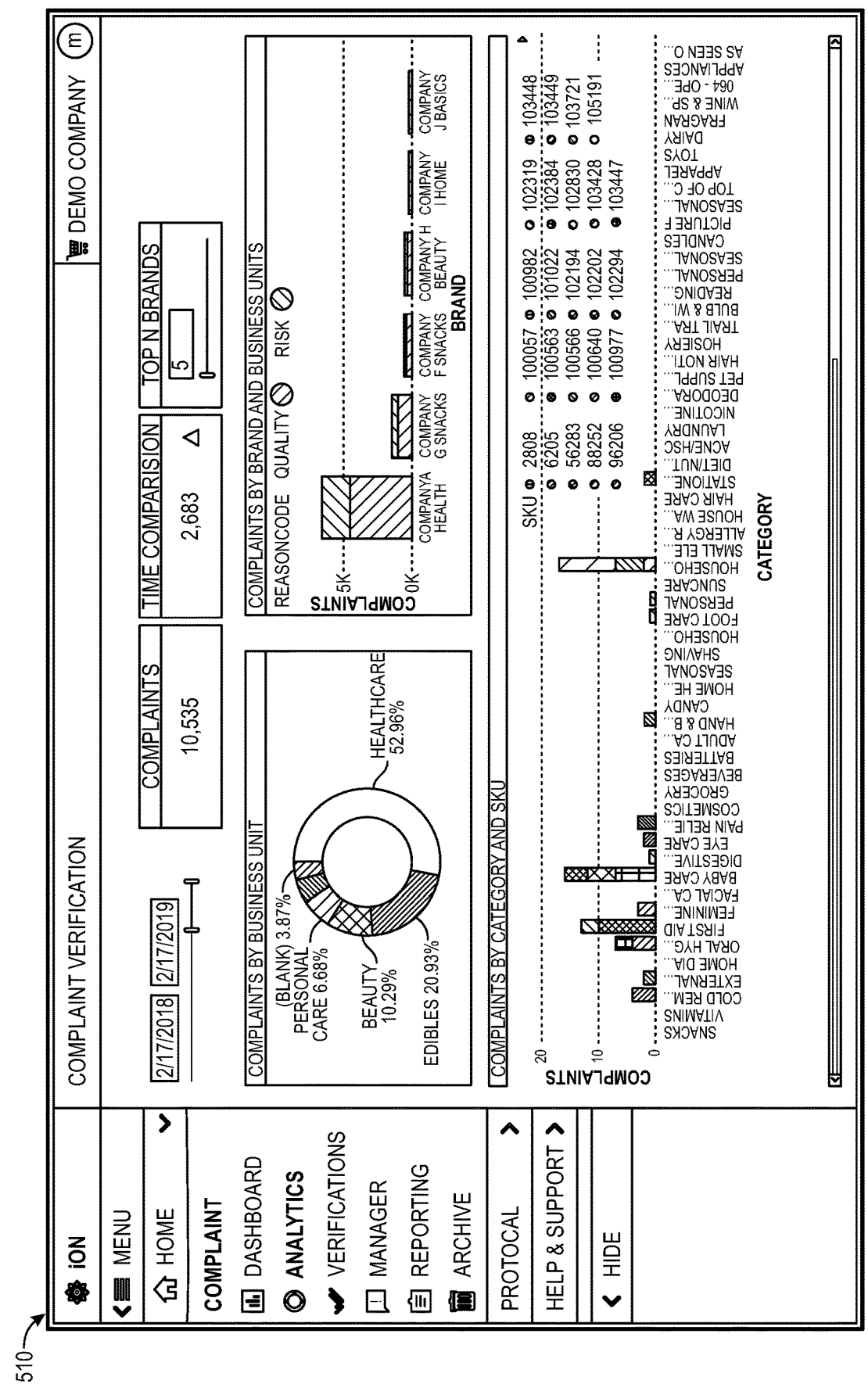

FIG. 5B depicts another interface 510 associated with the "Analytics" feature that includes additional data, charts, and the like associated with feedback entries, associated products, associated vendors, and/or the like. In particular, the interface 510 of FIG. 5B indicates complaints by business unit, complaints by brand and business units, and complaints by category and SKU.

Figure 5C:
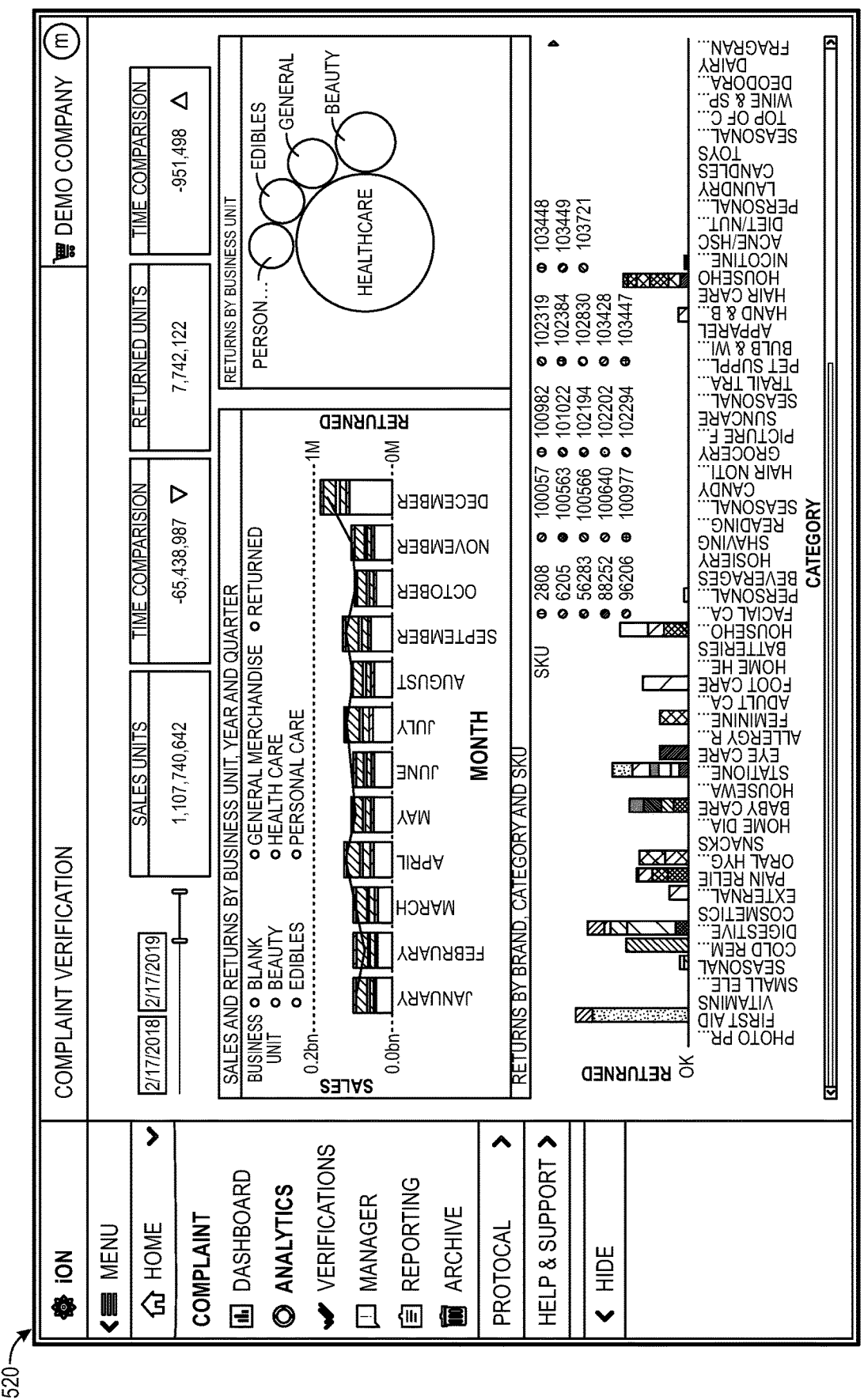

FIG. 5C depicts another interface 520 associated with the "Analytics" feature that includes additional data, charts, and the like associated with feedback entries, associated products, associated vendors, and/or the like. In particular, the interface 520 of FIG. 5C includes various sales and return data, including sales and returns by business unit, year, and quarter, returns by business unit, and returns by brand, category, and SKU.

Figure 6B:
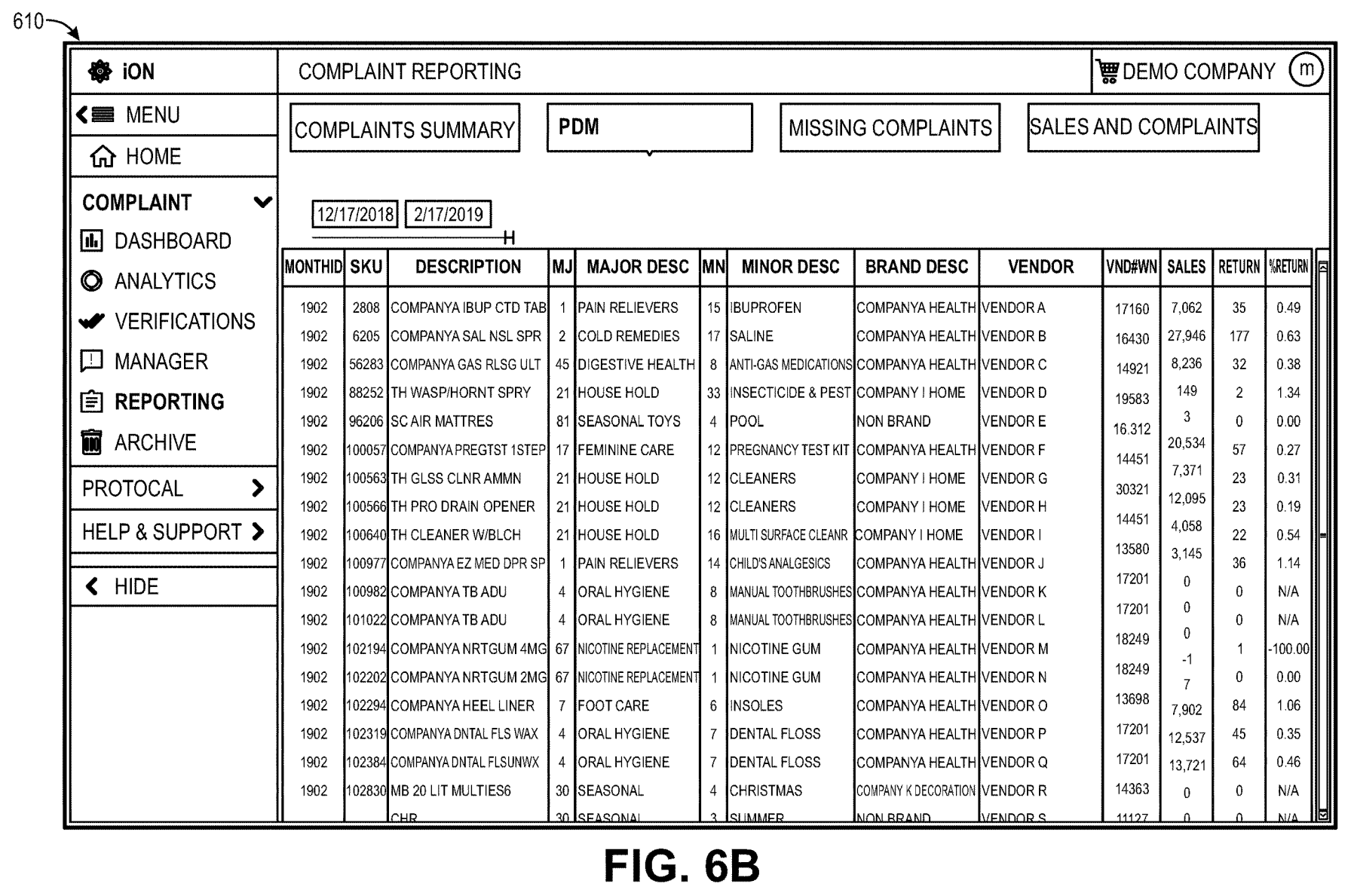
Figure 6C:
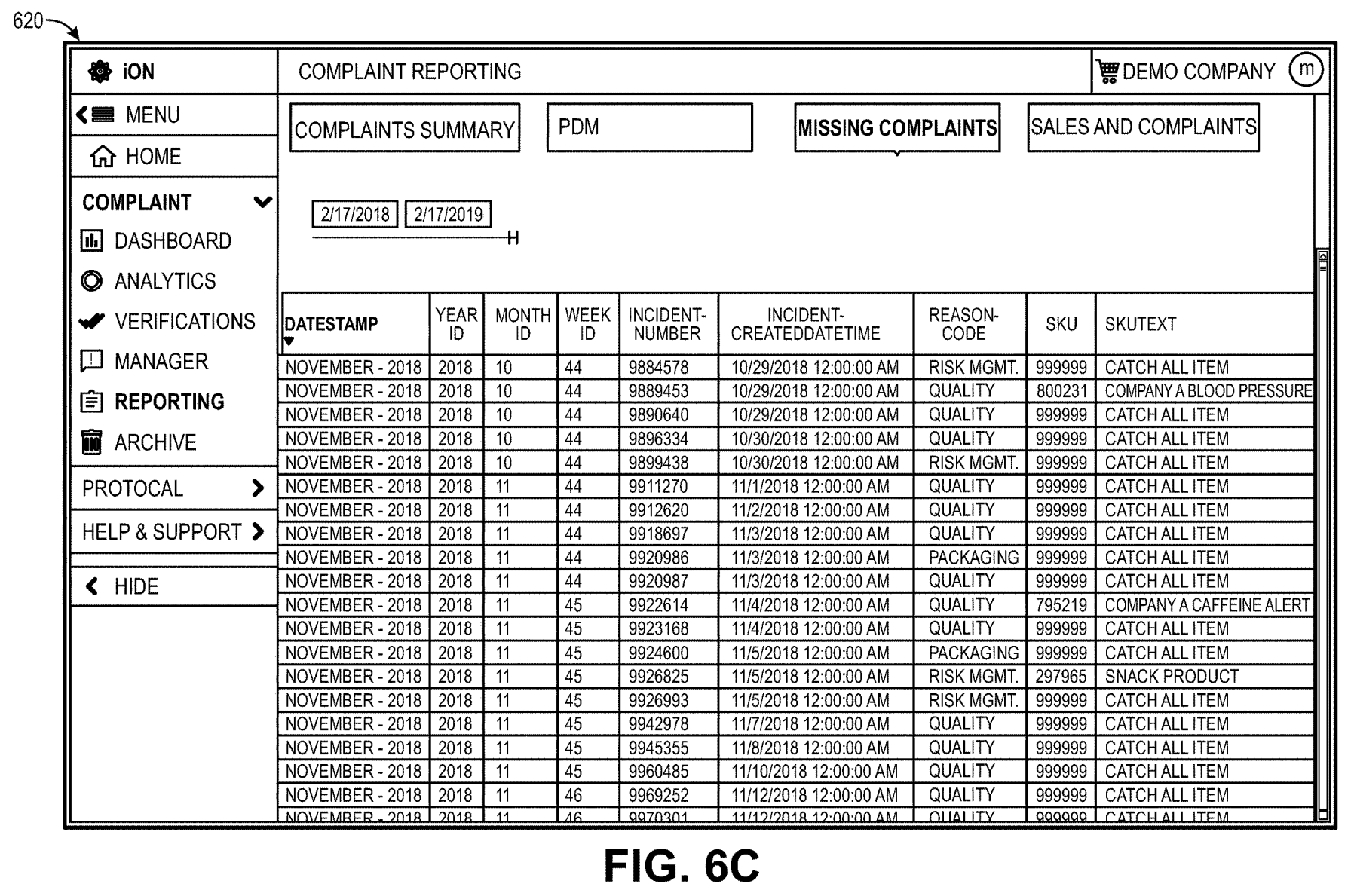
Figure 6D:
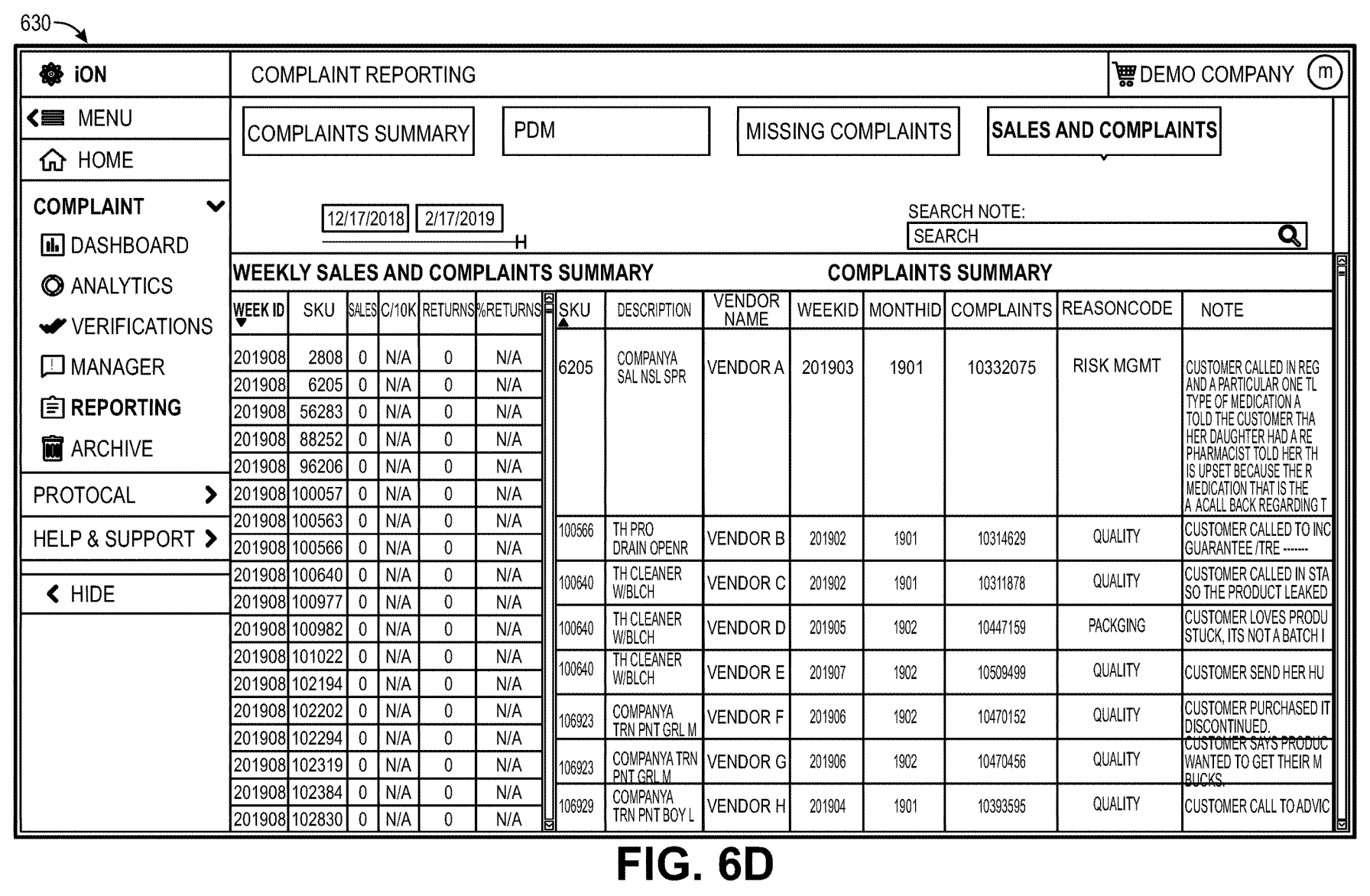

FIGS. 6A-6D depict various interfaces associated with the "Reporting" feature. In particular, FIG. 6A depicts an interface 600 indicating a summary of received complaints associated with products, FIG. 6B depicts an interface 610 indication certain sales and return data for various products, FIG. 6C depicts an interface 620 indicating a set of missing complaints, and FIG. 6D depicts an interface 630 indicating a weekly sales and complaints summary, and a complaints summary.

Figure 7:
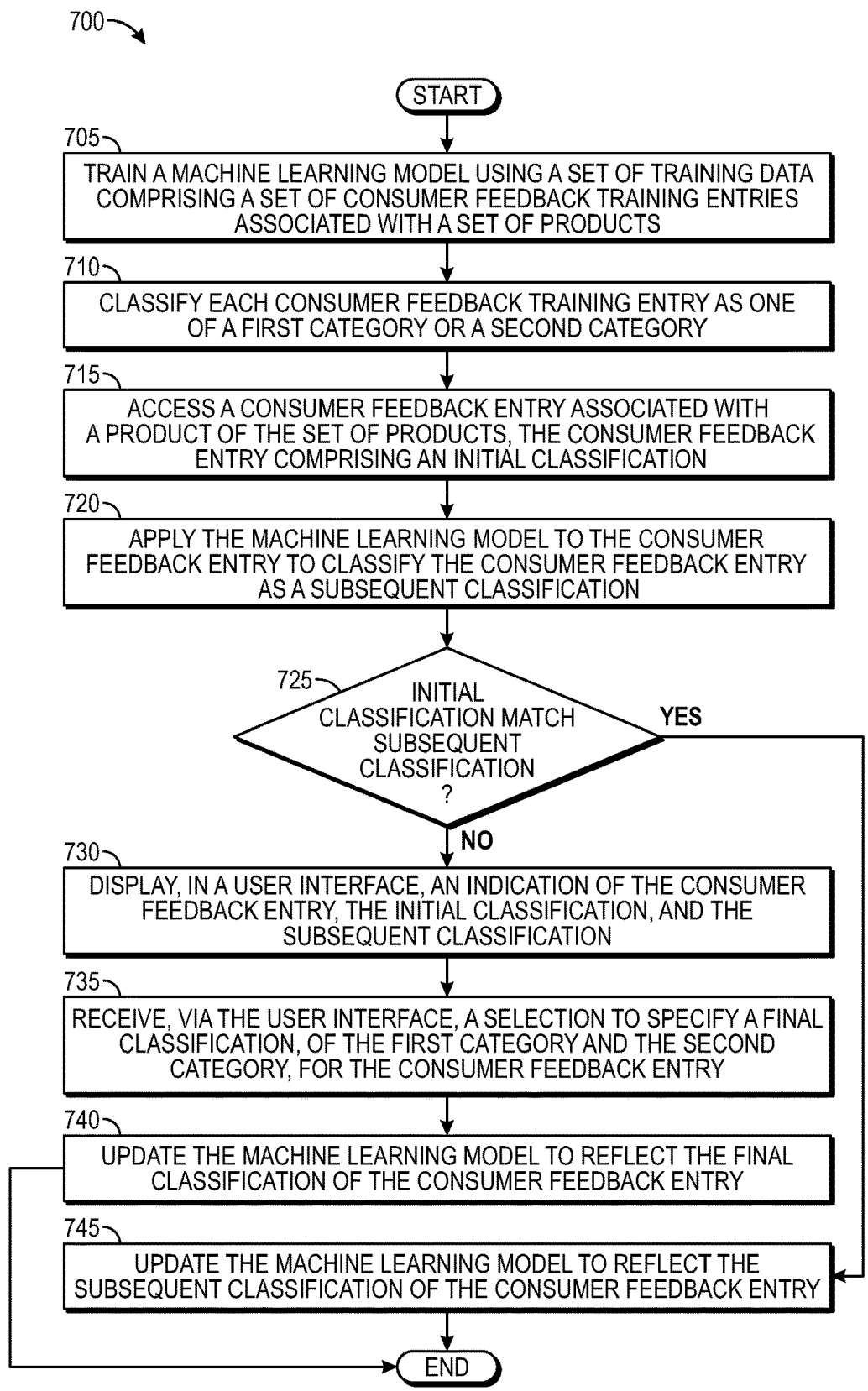
FIG. 7 is an example flowchart associated with classifying product feedback, in accordance with some embodiments.

FIG. 7 depicts is a block diagram of an example method 700 for classifying product feedback. The method 700 may be facilitated by an electronic device (such as server computer 115 or components associated with the feedback classifier platform as discussed with respect to FIGS. 1A and 1B) that may be in communication with additional devices or data sources.

The method 700 may begin when the electronic device trains (block 705) a machine learning model using a training dataset comprising a set of consumer feedback training entries associated with a set of products. In embodiments, the electronic device may locally receive or access the training dataset or may receive the training dataset from a third-party or external data source. Further, in embodiments, there may be one or more consumer feedback training entries for each product of the set of products.

In training the machine learning model, the electronic device may classify (block 710) each consumer feedback training entry as one of a first category or a second category. In an example embodiment, the first category may be "Risk" (or some other category with a negative connotation), and the second category may be "Quality" (or some other category with a positive connotation). Accordingly, the machine learning model may be stored to reflect the category of each consumer feedback training entry of the set of consumer feedback training entries.

The electronic device may access (block 715) a consumer feedback entry associated with a product of the set of products, where the consumer feedback entry may include an initial classification as one of the first category or the second category. In embodiments, the electronic device may access or receive the consumer feedback entry either locally or from an external device or source (e.g., one of the user electronic devices 101, 102, 103 as discussed with respect to FIG. 1A). Further, in embodiments, the initial classification may be specified by the user who submitted the consumer feedback entry, or by an external user who reviewed the consumer feedback entry.

The electronic device may apply (block 720) the machine learning model to the consumer feedback entry to classify the consumer feedback entry as a subsequent classification. The electronic device may determine (block 725) whether the initial classification matches the subsequent classification. For example, there is a mismatch if the initial classification is "Risk" and the subsequent classification is "Quality." If the initial classification does match the subsequent classification ("YES"), processing may proceed to block 745. In contrast, if the initial classification does not match the subsequent classification ("NO"), processing may proceed to block 730.

At block 730, the electronic device may display, in a user interface associated with the electronic device, an indication of the consumer feedback entry, the initial classification for the consumer feedback entry, and the subsequent classification for the consumer feedback entry. The electronic device may receive (block 735), via the user interface, a selection to specify a final classification, of the first classification and the second classification, for the consumer feedback entry. For example, if the initial classification is "Risk" and the subsequent classification is "Quality," the user may select the final classification as either "Risk" or "Quality" (i.e., thus agreeing with either the initial classification or the subsequent classification). In embodiments, the electronic device may receive a set of comments entered by the user in associating with specifying the final classification.

The electronic device may update (block 740) the machine learning model to reflect the final classification of the consumer feedback entry. Alternatively, if the initial classification matches the subsequent classification, at block 745, the electronic device may update the machine learning model to reflect the subsequent classification of the consumer feedback entry. Thus, the electronic device may analyze subsequent or additional consumer feedback entries using the updated machine learning model for more accurate results.

Although the following text sets forth a detailed description of numerous different embodiments, it should be understood that the legal scope of the invention may be defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that may be permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that may be temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it may be communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment, or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment.

As used herein, the terms "comprises," "comprising," "may include," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also may include the plural unless it is obvious that it is meant otherwise.

This detailed description is to be construed as examples and does not describe every possible embodiment, as describing every possible embodiment would be impractical.

Although the following text sets forth a detailed description of numerous different embodiments, it should be understood that the legal scope of the invention may be defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that may be permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that may be temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it may be communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment, or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment.

As used herein, the terms "comprises," "comprising," "may include," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also may include the plural unless it is obvious that it is meant otherwise.

This detailed description is to be construed as examples and does not describe every possible embodiment, as describing every possible embodiment would be impractical.

What is claimed is:

1. A computer-implemented method for classifying product feedback, the method comprising:

generating, by a processor, a machine learning model using an initial dataset comprising a set of initial consumer feedback entries associated with a set of products, including classifying each initial consumer feedback entry of the set of initial consumer feedback entries as one of a first category or a second category;

accessing, by the processor, a consumer feedback entry associated with a product of the set of products, wherein the consumer feedback entry comprises an initial classification as one of the first category or the second category, and wherein the initial classification is either specified by a user who submitted the consumer feedback entry or by an external user who reviewed the consumer feedback entry;

applying the machine learning model to the consumer feedback entry to classify the consumer feedback entry as a subsequent classification;

determining, by the processor, that the subsequent classification is the other of the first category or the second category such that the initial classification specified by the user or the external user and the subsequent classification classified by the machine learning model are mismatched;

in response to determining that the subsequent classification is the other of the first category or the second category, displaying, in a user interface, an indication of the consumer feedback entry, the initial classification, and the subsequent classification;

receiving, via the user interface, (i) a selection to specify a final classification, of the first category and the second category, for the consumer feedback entry, and (ii) a comment entered into a comment box of the user interface and associated with the final classification; and in response to receiving the selection and the comment:
classifying, by the processor, the consumer feedback entry with the final classification, and
updating the machine learning model to reflect the final classification of the consumer feedback entry.

2. The computer-implemented method of claim 1, wherein the first category is a risk and the second category is a quality.

3. The computer-implemented method of claim 1, wherein receiving, the via the user interface, the selection to specify the final classification for the consumer feedback entry comprises:
receiving, via the user interface, the selection to specify the final classification as the one of the first category or the second category.

4. The computer-implemented method of claim 1, wherein accessing the consumer feedback entry associated with the product comprises:
receiving, by the processor via a network connection, the consumer feedback entry from a user electronic device.

5. The computer-implemented method of claim 1, wherein generating the machine learning model comprises:
training, by the processor, the machine learning model using a training dataset comprising a set of consumer feedback training entries associated with the set of products, including classifying each consumer feedback training entry of the set of consumer feedback training entries as one of the first category or the second category.

6. A system for classifying product feedback, the system comprising:
a processor;
a memory storing data associated with a machine learning model;
a user interface; and
a non-transitory computer-readable memory coupled to the processor and the user interface, and storing instructions thereon that, when executed by the processor, cause the processor to:
generate the machine learning model using an initial dataset comprising a set of initial consumer feedback entries associated with a set of products, including classifying each initial consumer feedback entry of the set of initial consumer feedback entries as one of a first category or a second category,
access a consumer feedback entry associated with a product of the set of products, wherein the consumer feedback entry comprises an initial classification as one of the first category or the second category, and wherein the initial classification is either specified by a user who submitted the consumer feedback entry or by an external user who reviewed the consumer feedback entry,
apply the machine learning model to the consumer feedback entry to classify the consumer feedback entry as a subsequent classification,
determine that the subsequent classification is the other of the first category or the second category such that the initial classification specified by the user or the external user and the subsequent classification classified by the machine learning model are mismatched,
in response to determining that the subsequent classification is the other of the first category or the second category, cause the user interface to display an indication of the consumer feedback entry, the initial classification, and the subsequent classification,
receive, via the user interface, a selection to specify a final classification, of the first category and the second category, for the consumer feedback entry, and (ii) a comment entered into a comment box of the user interface and associated with the final classification, and
in response to receiving the selection and the comment:
classify the consumer feedback entry with the final classification, and
update the machine learning model to reflect the final classification of the consumer feedback entry.

7. The system of claim 6, wherein the first category is a risk and the second category is a quality.

8. The system of claim 6, wherein the processor receives, via the user interface, the selection to specify the final classification as the one of the first category or the second category.

9. The system of claim 6, wherein to access the consumer feedback entry associated with the product, the processor is configured to:
receive, via a network connection, the consumer feedback entry from a user electronic device.

10. A non-transitory computer-readable storage medium having stored thereon a set of instructions for classifying product feedback, the set of instructions comprising:
instructions, executable by a hardware processor, for generating a machine learning model using an initial dataset comprising a set of initial consumer feedback entries associated with a set of products, including classifying each initial consumer feedback entry of the set of initial consumer feedback entries as one of a first category or a second category;
instructions, executable by the hardware processor, for accessing a consumer feedback entry associated with a product of the set of products, wherein the consumer feedback entry comprises an initial classification as one of the first category or the second category, and wherein the initial classification is either specified by a user who submitted the consumer feedback entry or by an external user who reviewed the consumer feedback entry;
instructions, executable by the hardware processor, for applying the machine learning model to the consumer feedback entry to classify the consumer feedback entry as a subsequent classification;
instructions, executable by the hardware processor, for determining that the subsequent classification is the other of the first category or the second category such that the initial classification specified by the user or the external user and the subsequent classification classified by the machine learning model are mismatched;
instructions, executable by the hardware processor, for, in response to determining that the subsequent classification is the other of the first category or the second category, displaying, in a user interface of an electronic device, an indication of the consumer feedback entry, the initial classification, and the subsequent classification;
instructions, executable by the hardware processor, for receiving, via the user interface, a selection to specify a final classification, of the first category and the second category, for the consumer feedback entry, and (ii) a comment entered into a comment box of the user interface and associated with the final classification; and instructions, executable by the hardware processor, for, in response to receiving the selection and the comment:
   classifying the consumer feedback entry with the final classification, and
   updating the machine learning model to reflect the final classification of the consumer feedback entry.

11. The non-transitory computer-readable storage medium of claim 10, wherein the first category is a risk and the second category is a quality.

12. The non-transitory computer-readable storage medium of claim 10, wherein the instructions for accessing the consumer feedback entry associated with the product comprise:
   instructions, executable by the hardware processor, for receiving, by the processor via a network connection, the consumer feedback entry from a user electronic device.

* * * * *